United States Patent [19]

Dorogi et al.

[11] Patent Number: 4,767,682

[45] Date of Patent: Aug. 30, 1988

[54] METHOD FOR ASSEMBLING A CELL EMPLOYING A COILED ELECTRODE ASSEMBLY

[75] Inventors: Joseph D. Dorogi, Rocky River; Imre A. Pattantyus, North Olmstead; Christopher S. Pedicini, Brunswick, all of Ohio

[73] Assignee: Eveready Battery Company, St. Louis, Mo.

[21] Appl. No.: 97,552

[22] Filed: Sep. 11, 1987

[51] Int. Cl.$^4$ .................. H01M 2/26; H01M 2/30
[52] U.S. Cl. ............................ 429/94; 29/623.2
[58] Field of Search .................. 429/94; 29/623.2

[56] References Cited

U.S. PATENT DOCUMENTS

| | | | |
|---|---|---|---|
| 3,503,806 | 3/1970 | Sugalski | 136/13 |
| 3,505,121 | 4/1970 | Bougaran | 136/120 |
| 3,732,124 | 5/1973 | Cailley | 429/94 |
| 4,332,867 | 6/1982 | Tsuda et al. | 429/94 |

Primary Examiner—Donald L. Walton

[57] ABSTRACT

The invention relates to a simple and inexpensive method for automatically producing a cell employing a coiled electrode assembly having the edge of one electrode strip extending beyond the coiled electrode assembly at one end and the edge of the other electrode strip extending beyond the opposite end of the coiled electrode assembly with the extending edge of each electrode strip being electronically connected to a terminal for the cell via a conductive tab. The invention also relates to the coiled electrode cells produced by the method.

32 Claims, 4 Drawing Sheets

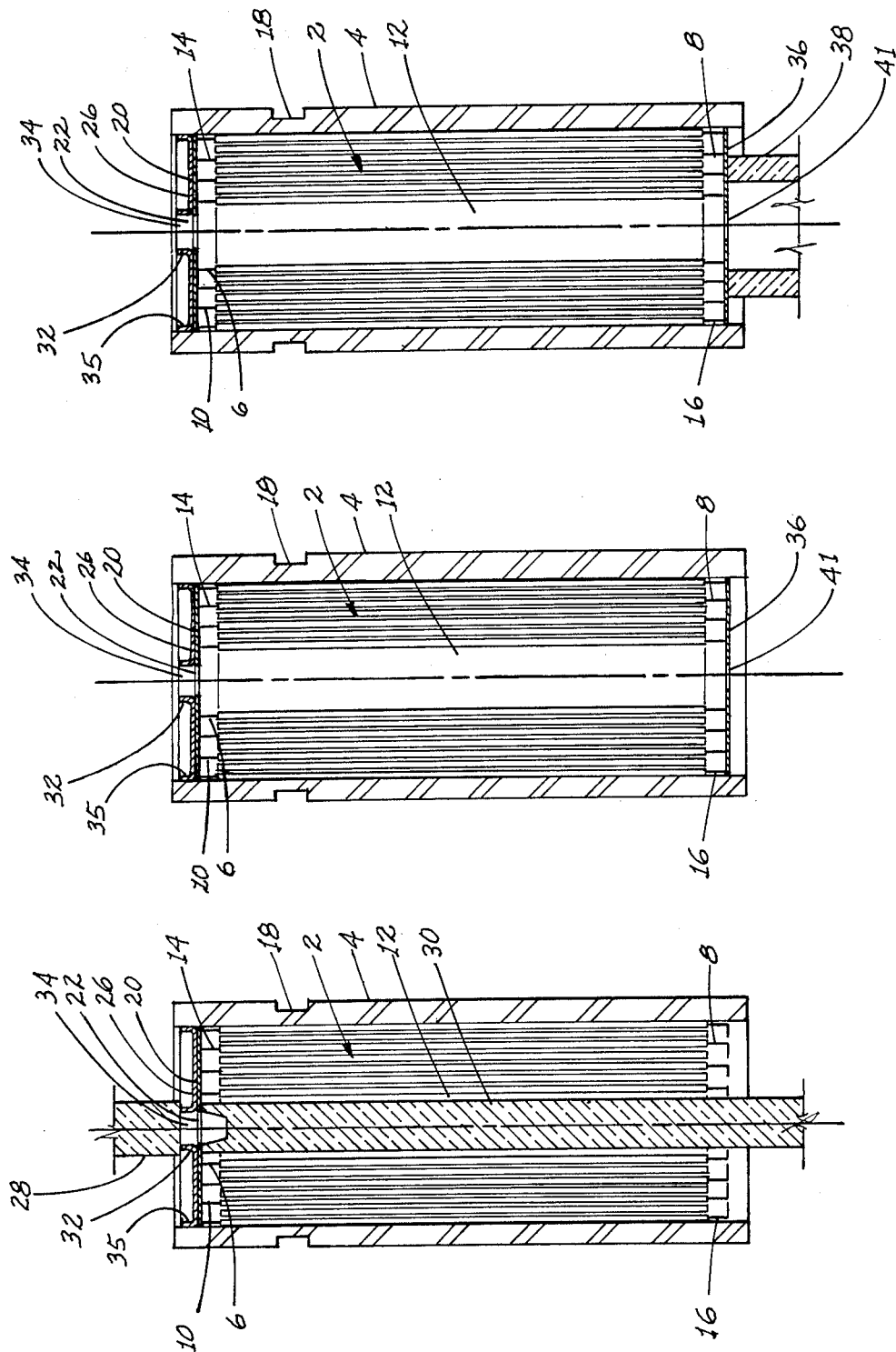

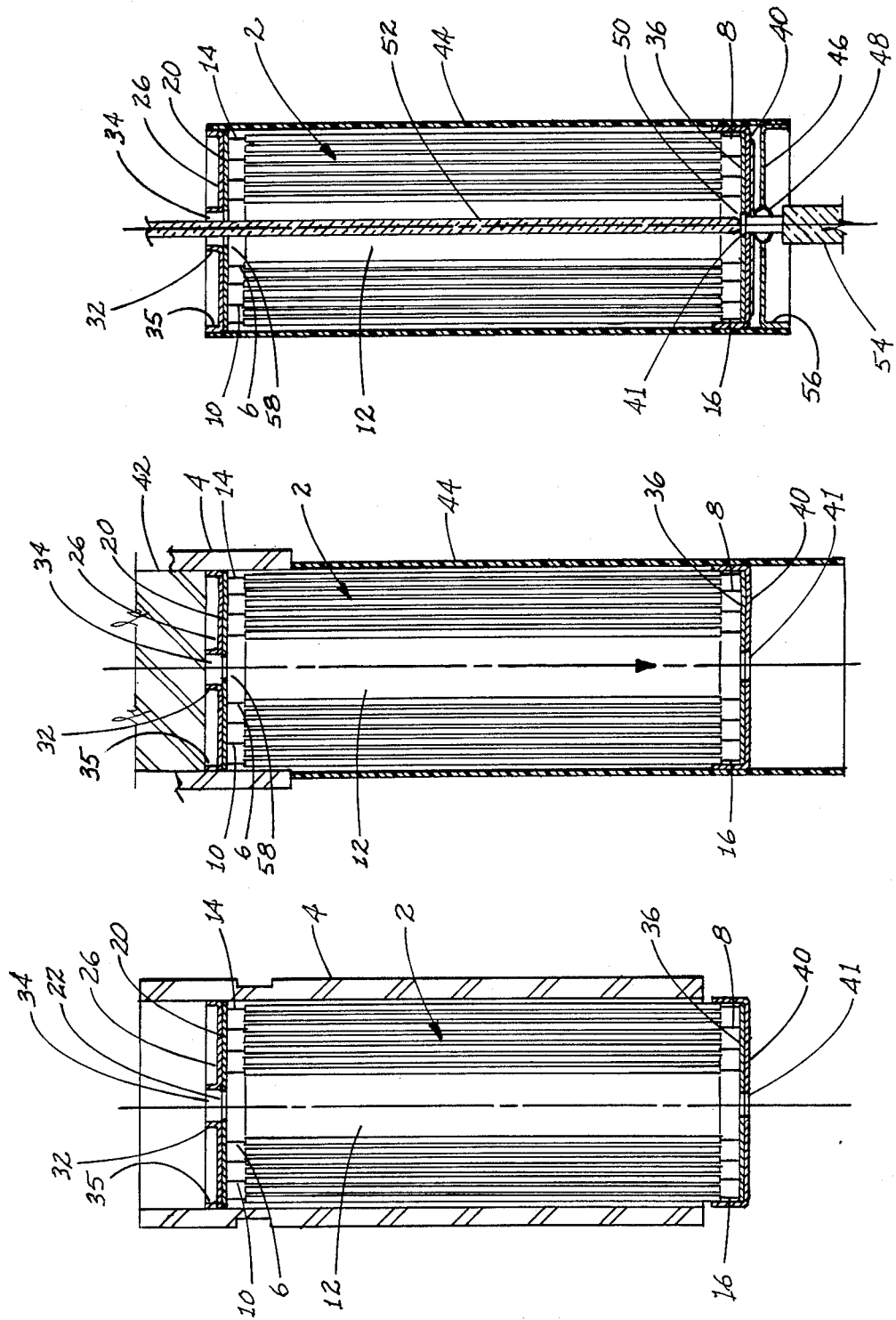

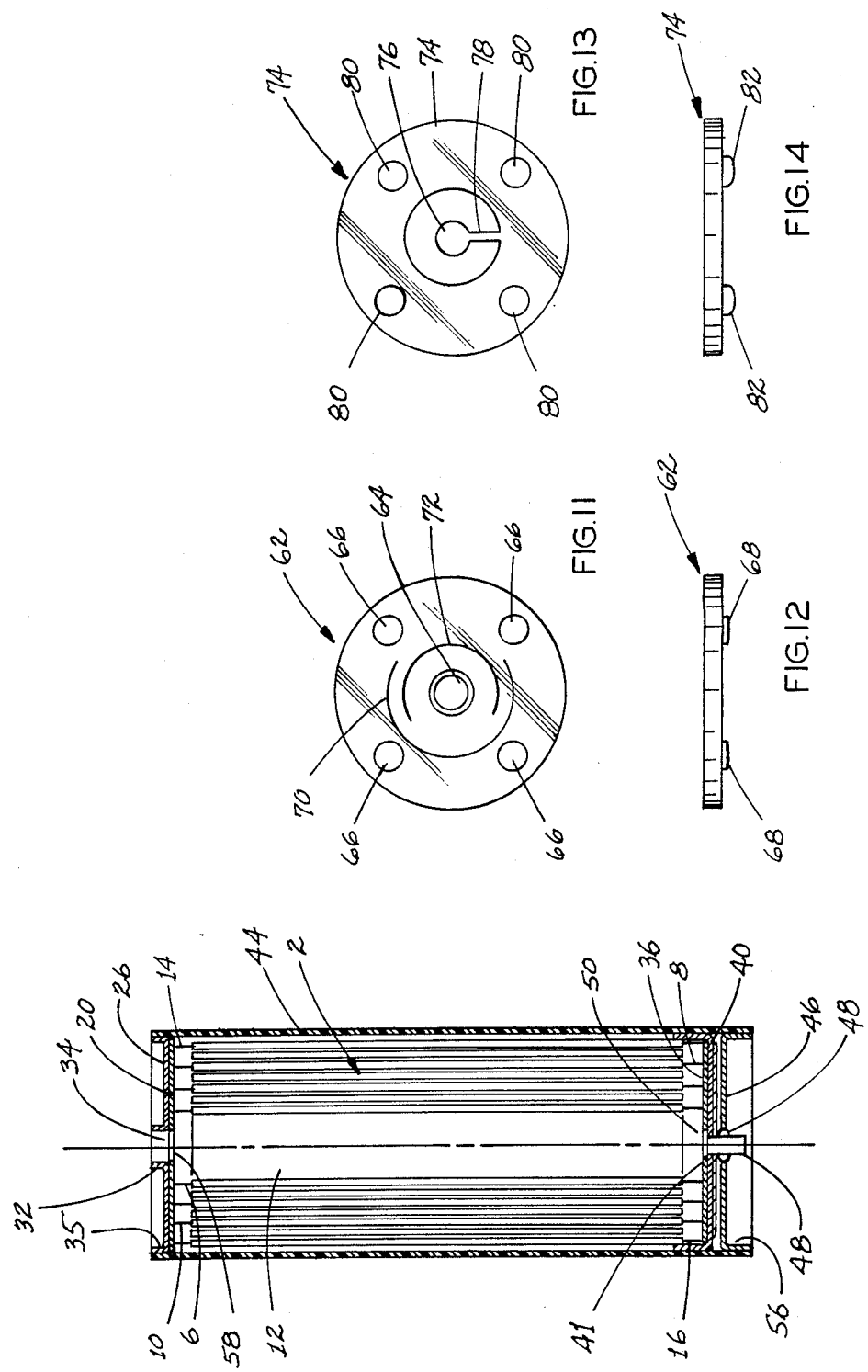

4,767,682

METHOD FOR ASSEMBLING A CELL EMPLOYING A COILED ELECTRODE ASSEMBLY

FIELD OF THE INVENTION

The invention relates to a method for producing a cell employing a coiled electrode assembly having the edge of one electrode strip extending beyond the coiled electrode assembly at one end and the edge of the other electrode strip extending beyond the opposite end of the coiled electrode assembly with the extending edge of each electrode strip being electronically connected to a terminal for the cell and the cells produced by this method.

BACKGROUND OF THE INVENTION

The galvanic cell has become a primary power source for many portable electronic devices such as tape recorders, portable telephones, lanterns, radios and the like. In order to maintain the overall electronic devices as compact as possible, the electronic devices are usually designed with cavities to accommodate batteries as their power source. The cavities are usually made so that a battery can be snugly positioned therein, thus making electronic contact with appropriate terminals within the device. To accommodate the electronic component manufacturers, the battery industry has adapted several conventional size cells which the manufacturers can rely upon in designing their devices which require portable power sources. Due to the large number of battery-powered devices on the market, there has been a demand for increased power output capacities of standard size cells. Accordingly, various cell constructions have been employed so as to provide a sufficient output capacity. For example, cells with coiled electrode assemblies (jellyroll construction) have been used to increase the intefacial area contact between the active cell components. Use of coiled electrodes serves to decrease the cell's internal resistance and thereby increase the maximum possible drain rates. Cells that incorporate a jellyroll construction are widely known in the battery art and usually involve placement of the coiled electrode in a composite housing which serves as the current conductive terminals for the cell. In such structures, the electrode of one polarity can be electrically connected to a conductive housing portion, and the electrode of the opposite polarity can be generally electrically connected to another conductive housing portion which is insulated relative to the electrically conductive first-mentioned housing portion. The electrical contact between each electrode and its respective housing portion is generally formed by an elongated flexible electrically conductive connecting tab (current collector tab) or element which is secured at one end to the electrode and at the other end is secured to the respective housing portion. The current collector tabs are generally attached to the electrodes or electrode carriers, by welding, pressure contact or other conventional means. This technigue requires time-consuming manual operations (in the cell assembly process) which serves to reduce line productivity and add to the manufacturing costs. For example, some of the problems associated with using this method of tabbing are: (1) the obvious difficulty of handling and welding narrow strips of metal within the confined space of the cell; (2) dedicating a disproportionate percentage of the volume within the cell to accommodate the tab and assembly process; (3) the tab is connected to the electrode in only one spot and therefore it is possible that any bulging of the cell could break the weld causing an open circuit; and (4) coil insertion is difficult due to the ease with which the electrodes and/or separator may be damaged.

U.S. Pat. No. 3,505,121 discloses a procedure for substantially uniformly welding current collectors to protruding edges of respective opposite polarity electrodes assembled as a winding or block of such electrodes wherein the edges of opposite polarity electrodes protrude from opposite ends of the winding or block. The procedure comprises applying plate-like members of a collector unit to cover portions of such protruding edges and also applying a counter welding electrode to portions of edges of such protruding electrodes not covered by and adjacent the portions covered by said members and applying a welding electrode to such members and passing welding current between the welding and counter welding electrodes so as to weld the members to the edge portions of the electrodes in the winding or block covered thereby said current which is uniformly distributed by the disposition of said welding and counter-welding electrodes relative to each other. The collector plate members may have maltese cross-like shape and the counter electrodes complementary shape to fit into spaces between rays of the cross. Other shapes may be given to said plate-like members and to said counter electrodes.

U.S. Pat. No. 3,503,806 discloses a cell construction in which the negative plate edges extend longitudinally beyond the positive plate edges in one direction and the positive plate edges extend longitudinally beyond the negative plate edges in the opposite direction. Terminal straps are attached to the extending edges of the plates at a plurality of points. The plates may be spirally wound and the negative plate connected to a conductive casing through one terminal strap and the positive plate connected to terminal rivet through the remaining terminal strap. As a separate or combined feature a resilient washer having a durometer rating the range of from 15 to 95 may be positioned adjacent either or both ends of the plates.

It is an object of the present invention to provide a method for assembling coiled electrodes into a cell housing that is cost effective and suitable for automatic assembly operations.

It is another object of the present invention to provide a novel method for assembling a cell with coiled electrodes.

It is another object of the present invention to provide a method for assembling coiled electrodes into a cell housing in which each coiled electrode extends beyond a different end of the coiled electrode assembly and is secured to a conductive tab such that multiple edge electrode contact points are made with the tab.

The foregoing and additional objects will become fully apparent from the following description and the accompanying drawings.

SUMMARY OF THE INVENTION

The invention relates to a method of assembling a cell employing a coiled electrode assembly comprising the steps:

(a) preparing a coiled electrode assembly by superimposing and overlapping a first electrode strip onto a second electrode strip with an insulating separator between said first electrode strip and said second electrode strip and winding said first electrode strip, said separator and said second electrode strip into a coiled electrical assembly having a central disposed opening with the edge of said first electrode strip protruding from one end of said coiled electrode assembly and the edge of said second electrode strip protruding from the opposite end of said coiled electrode assembly;

(b) electronically connecting and securing a first conductive tab onto the projected edge of said first electrode strip, said first conductive tab having a centrally disposed opening in alignment with said centrally disposed opening in said coiled electrode assembly;

(c) securing a first conductive cover having a centrally disposed opening onto said first conductive tab with said opening in alignment with said opening in said first conductive tab and said opening in said electrode assembly thereby adapting said first conductive cover as the first electrode terminal;

(d) electronically connecting and securing a second conductive tab onto the projected edge of said second electrode strip;

(e) positioning said coiled electrode assembly into a tube, said tube having a closed end with a centrally disposed conductive terminal;

(f) securing said closed end with a centrally disposed conductive terminal onto said second tab such that the terminal electronically contacts said second tab thereby adapting said terminal as the second electrode terminal; and (g) sealing said first cover to the tube, feeding an electrolyte solution through said opening in said first cover into the opening in the coiled electrode assembly, and sealing said opening in said first cover with a plug, thus producing a sealed cell.

The invention also relates to an electrochemical cell comprising a coiled electrode assembly and electrolyte solution assembled in a housing, said housing comprising a tube closed at each end by a cover; said coiled electrode assembly comprising a first electrode strip superimposed on and overlapping a second electrode strip and a separator disposed between said first electrode strip and said second electrode strip; said first electrode strip, said second electrode strip and said separator wound into a coiled electrode assembly such that said first electrode strip is electronically insulated from said second electrode strip by said separator and the edge of said first electrode strip protrudes from one end of the coiled electrode assembly and the edge of said second electrode strip protrudes from the opposite end of the coiled electrode assembly; a first conductive tab having an opening at its center and being in electronic contact with and secured to the edge of the first electrode strip; a first cover secured to one end of the tube and having a centrally disposed opening, said first cover electronically in contact with and secured to said first tab thereby adapting said first cover as the first electrode terminal; a second conductive tab in electronic contact with and secured to the edge of the second electrode strip; a conductive closure secured to the opposite end of the tube and having at least a central conductive portion in electronic contact with and secured to the central portion of said second tab thereby adapting said second conductive closure as the second electrode terminal; and said opening in the first conductive cover closed by a plug thereby forming a sealed cell.

As used herein, a tube could be a cylindrical member, a square member, a polygonal shaped member or any elongated hollow member having an outer configuration of any shape. For most cell applications, the tube will be a hollow cylindrical member opened at both ends or closed at one end by a conductive closure which could be an integral part of the tube, and preferably made of a material such as stainless steel, cold rolled steel, aluminum, zinc, nickel, nickel alloys or nickel plated steel.

The first conductive tab would preferably be circular for a cylindrical tube and have a central opening. In the preferred embodiment of this invention the first tab would have at least one opening. preferably two or more equally spaced openings, disposed in the area between the peripheral edge of the tab and the central opening in the tab. The opening would be defined by an inward flange that would contact the protruding edge of the first electrode strip and thus provide numerous contact points between the first tab and the edge of the first electrode strip. Preferably three or more circular openings disposed concentrically about the central opening of the tab with each opening defined by an inwardly disposed flange would provide a substantial number of contact points between the edge of the first electrode strip and the first tab. More preferred, the first tab should have four circular openings disposed concentrically about the central opening at intervals of 90° to provide multiple contact points between the first tab and the edge of first electrode strip. Thus, if one of the electronic connections between the flange and the electrode strip breaks, there still would be several contact points remaining for adequate electronic continuity.

The second conductive tab would preferably be a circular disc for a cylindrical tube cell construction. Similar to the first conductive tab, the second conductive tab in the preferred embodiment of the invention would have at least one opening, preferably two or more equally spaced openings, disposed in the area between the peripheral edge of the second tab and the central area of the second tab. The opening would be defined by an inward flange that would contact the protruding edge of the second electrode strip and thus provide numerous contact points between the second tab and the edge of the second electrode strip. Preferring three or more circular openings disposed concentrically about the central area of the second tab with each opening defined by an inwardly disposed flange would provide a substantial number of contact points between the edge of the second electrode strip and the second tab. If one of the electronic connections between the flange and electrode strip breaks, there still would be several contact points remaining for adequate electronic continuity. More preferably, the second tab should have four circular openings disposed concentrically about the central area at intervals of 90° to provide multiple contact points between the second tab and the edge of the second electrode strip.

In an alternate embodiment of the invention, the openings disposed in the area between the peripheral edge of the tab and the central opening or area of tab could be replaced by inward protrusions such as dimples. These inward protrusions would contact the edge of the electrode strip and provide numerous contact points between the tab and the electrode strip.

In the most preferred embodiment of the invention, the second tab would have a central area that could flex so that a conductive terminal cover electronically secured to the tab may bulge without disturbing the electronic contact between the second electrode strip and the second tab. This telescopic type of tab is disclosed in U.S. patent application Ser. No. 097,551 filed concurrently with this application and disclosed in this U.S. patent application Ser. No. 097,551 is incorporated herein as if the disclosure was recited herein in its entirety. Specifically, the second conductive tab could have at least one slit disposed substantially about the central area of the second tab to enable the central area to flex above and then below the plane of the second tab without effectively distorting the peripheral area of the second tab so that when the second tab is in electronic contact with the protruding edge of the second electrode strip, the second tab can flex upon bulging of the cell without disturbing the electronic continuity of the cell. The slit disposed substantially about the central area of the second tab could be in the form of one arcuate shaped slit or two more arcuate or straight line shaped slits or combinations thereof as long as the central area of the second tab can flex above or below the plane of the tab without effectively distorting the peripheral area of the tab. Thus, in the most preferred embodiment of the invention, the second tab, through the inward disposed flanges, would provide numerous contact points to the edge of the second electrode strip which could easily be welded together while the central area of the second tab would flex (via the slits) to accommodate any bulging of the cell's second cover connected to the second tab without breaking the welds.

In a similar manner the first tab could also be designed with one or more slits disposed around the opening in the center of the first tab so that the area between the opening at the center and the peripheral portion could flex above or below the plane of the first tab. With the peripheral portion of the first tab secured by welding to the edge of the first electrode strip and the area between the opening and the peripheral portion secured to the first cover, any bulging of the cell's first cover would flex the first tab without breaking the welds to the edge of the first electrode strip.

Another preferred embodiment of this invention would employ a second tab having a central area portion integrally connected to the remaining portion of the second tab only by a thin strip such that the central area portion could flex about the thin strip below or above the plane of the second tab. The central area portion of the second tab could be secured to a terminal in the central area of the second cover such that the terminal would be adapted as the second electrode terminal of the cell. The electronic continuity of the second electrode strip and the terminal in the second cover would be through the thin strip integrally securing the central area portion of the tab to the outer portion of the tab which would be electronically connected to the edge of the second electrode strip. The width of the strip connecting the central area portion to the outer portion of the tab could be selected so that if a current flow exceeding a predetermined level passes through the cell, the strip would burn through (i.e., fuse) thereby breaking the electronic continuity of the cell to render the cell inoperative. This would provide a fail safe means against excessive current flow in the cell which could be due to abusive discharge conditions. This novel fuse type tab is disclosed in U.S. patent application Ser. No. 097,577 filed concurrently with this application and the disclosure in this U.S. patent application Ser. No. 097,577 is incorporated herein as if the disclosure was recited herein in its entirety.

The coiled electrode assembly of this invention typically comprises two electrode strips and a separator. One electrode strip acts as an anode or anode current collector and the other serves as a cathode or cathode current collector. The anode or anode current collector, cathode or cathode current collector and separator are made of flexible materials and are typically formed into strips and superimposed upon each other with one electrode strip overlapping the other. This is accomplished by superimposing and overlapping the first electrode strip over the second electrode strip with the separator interposed between the two electrode strips. This assembly is then wound to form a coiled electrode assembly which is preferably cylindrical in outer contour with a central opening and which has the edge of the first electrode strip protruding from the top of the electrode assembly and the edge of the second electrode strip protruding from the bottom of the electrode assembly. The central opening in the coiled electrode assembly is typically cylindrical, however, it could be elliptical or of any other configuration.

The tabs for use in this invention can be made of any conductive material such as nickel plated steel, nickel foil, nickel alloy, aluminum and stainless steel or a nonconductive material coated with a conductive layer, such as plastic films (polyester) coated with a metallic layer or a layer of conductive paint. Generally, these tabs should be circular in shape to be compatible with the coiled electrode assembly and should be relatively thin so that they could flex easily. For most applications each tab could be between about 0.001 inch and about 0.01 inch thick and more preferably between about 0.002 and 0.005 inch thick. The tabs are relatively thin and therefore occupy only a small volume within the cell.

In the preferred embodiment of the invention four peripheral openings spaced 90° apart should be disposed concentrically about the central area of each tab. As stated above each opening should be defined by an inwardly disposed flange which is adapted to make pressure contact with the protruding edge of the respective electrode strip. The openings are placed between the central area of the tab and the peripheral edge to insure proper contact with the protruding edge of the respective electrode strip. Once each tab is placed over the coiled electrode assembly, the flanges can be welded to the respective edge of the protruding electrode strip using the method of this invention. With the coiled electrode assembly positioned in a tube and each tab welded to the edge of the respective protruding electrode strip, a terminal cover can be placed over and secured to each tab and then the edge of each cover can be secured to the tube using the method of this invention. Bulging of the cell could be accommodated by the telescoping of the central area of the second tab and/or the selected area of the first tab without disrupting the electronic contact between each tab and the respective electrode strip.

As used herein, an electrode strip shall mean an active electrode such as a solid anode or cathode of the cell or an electrochemically inactive strip such as an anode current collector or a cathode current collector employed along with an active liguid, solid or gas anode or cathode, respectively.

The coiled electrode assembly of this invention can be used in many different types of cell systems such as aqueous (i.e., alkaline) or nonaqueous cell systems employing solid or liquid cathodes. When the coiled electrode assembly is employed in lithium nonaqueous cells, it would sometimes be preferable to make the lithium the outer wound electrode strip. The lithium electrode could be superimposed and overlayed on a cathode strip such as $MnO_2$, CuO, $CF_x$, $FeS_2$, $TiS_2$ or the like with a separator interposed between them, and then wound with the edge of both electrode strips protruding from opposite ends of the coiled electrode assembly.

The separator for use in this invention could be selected from a number of ionically permeable materials such as polypropylene, felted glass fibers and coated papers.

Cathode current collectors suitable for use in the invention would be sintered nickel or carbonaceous materials such as Teflon-bonded carbon or the like. Anode current collectors suitable for use in the invention would be nickel foil, stainless steel foil, expanded metal, perforated metal or the like.

The covers for use in this invention can be stainless steel, nickel-plated steel or some other conductive material that will not corrode or otherwise deteriorate when in contact with the active cell components. Preferably for nonaqueous systems the can and cover could be made of 304L type stainless steel.

Any insulating gasket member disposed between one of the covers and a conductive tube has to be stable in the presence of the active components and discharge products and can be selected from such materials as nylon, polypropylene, polyethylene, polytetrafluoroethylene, fluorinated ethylene-propylene polymer, ethylene copolymer with fluorinated ethylenepropylene, polyester, polychlorotrifluoroethylene, perfluoroalkoxy polymer and the like.

Anodes suitable for use in this invention could be lithium, calcium, magnesium, sodium, zinc and the like. Cathodes suitable for use in this invention could be $MnO_2$, HgO, $Ag_2O$, CuO, $FeS_2$, $TiS_2$, $(CF_x)_n$ with x greater than 0 and less than 1.1, $SOCl_2$, $(C_2F)_n$, $SO_2Cl_2$ and $SO_2$. Some preferred cell systems for use in this invention would be as shown in the Table below.

TABLE

| Anode | Cathode | Electrolyte |
| --- | --- | --- |
| lithium | $MnO_2$ | organic |
| lithium | $SOCl_2$ | $LiAlCl_4$ in $SOCl_2$ |
| lithium | $(CF_x)n$ | organic |
| zinc | $MnO_2$ | aqueous alkaline |
| cadmium | nickel hydroxide | aqueous alkaline |

When the anode for use in this invention is lithium, then a lithium foil could be secured onto a metallic conductive foil or carrier (anode current collector) such as nickel.

The foregoing and additional objects will become more fully apparent from the description hereinafter and the accompanying drawings.

BRIEF DESCRIPTION OF THE DRAWINGS

FIG. 4 is a sectional elevational view of the coiled electrode assembly of FIG. 3 showing a first cover being welded to the first tab.

FIG. 5 is a sectional elevational view of the coiled electrode assembly of FIG. 4 showing a second circular tab disposed onto the edge of the second electrode strip.

FIG. 6 is a sectional elevational view of the coiled electrode assembly of FIG. 5 showing the welding of the second circular tab to the edge of the second electrode.

FIG. 7 is a sectional elevational view of the coiled electrode assembly of FIG. 6 showing an insulating cap disposed over the second tab.

FIG. 8 is a sectional elevational view of the coiled electrode assembly of FIG. 7 being pushed out of the carrier into a tube.

FIG. 9 is a sectional elevational view of the coiled electrode assembly of FIG. 8 positioned in the tube and having a cover secured to the second tab.

FIG. 10 is a sectional elevational view of the coiled electrode assembly of FIG. 9 having the center opening of the first cover plugged thereby producing a sealed cell.

FIG. 11 is a top plan view of another embodiment of a circular tab for use in this invention at the first tab.

FIG. 12 is a sectional elevational view of the tab of FIG. 11.

FIG. 13 is a top plan view of another embodiment of a circular tab for use in this invention as the second tab.

FIG. 14 is a sectional elevational view of the tab of FIG. 13.

With respect to FIGS. 1 through 10, the same component parts of the coiled electrode cell assembly in each figure has been identified with the same reference numbers.

Referring to the drawings, FIG. 1 shows a coiled electrode assembly 2 after it has been pushed by member 3 into carrier 4, said coiled electrode assembly 2 prepared by superimposing and overlapping a first electrode strip 6 onto a second electrode strip 8 with an insulating separator 10 between said electrode strip 6 and said electrode strip 8. The electrode strip 6 extends at end while electrode strip 8 extends at the opposite end so that upon winding the electrode strips into a coiled assembly a central opening 12 is defined at its center with the edge 14 of the electrode strip 6 extending from one end and the edge 16 of electrode strip 8 extending from the opposite end. Carrier 4 has a groove 18 in its circumference closer to one end so that when the coiled electrode assembly 2 is positioned in carrier 4, the first electrode strip can be located at the end containing the groove 18. This provides a means to orientate the coiled electrode assembly 2 in carrier 4 so that if the carrier 4 is inadvertently turned upside down, the end with groove 18 will be the end with the first electrode strip protruding from the coiled electrode assembly 2.

FIG. 2 shows the coiled electrode assembly 2 of FIG. 1 in carrier 4 and a first circular tab 20 being disposed on top of edge 14 of electrode strip 6. Tab 20 is shown as a flat disc having a central opening 22 in alignment with opening 12 in coiled electrode assembly 2. FIG. 3 shows the coiled electrode assembly 2 and tab 20 of FIG. 2 along with a welding electrode 24 used to weld tab 20 to edge 14 of electrode strip 6. In FIG. 4, a cover 26 is disposed over tab 20 and using welding electrodes 28 and 30, cover 26 is welded to tab 20. Cover 26 is a disc having an internal upstanding flange 32 defining an opening 34 in alignment with opening 22 of tab 20 and opening 12 of coiled electrode assembly 2. To insure proper welding of cover 26 to tab 20, the opening 12 in coiled electrode assembly 2 has to be larger in diameter than opening 22 in tab 20 and opening 34 in cover 26. Cover 26 also has a peripheral upstanding flange 35.

FIG. 5 shows the partial assembly of coiled electrode assembly 2 of FIG. 4 having a second conductive tab 36 disposed over the edge 16 of electrode strip 8. In FIG. 6, welding alectrode 38 is shown welding tab 36 to the edge 16 of electrode strip 8.

FIG. 7 shows an insulating cap 40 having a central opening 41 placed over tab 36 whereupon as shown in FIG. 8, a ram 42 is used to push the partially assembled coiled electrode assembly cell into a circular tube 44. As shown in FIG. 8, insulating cap 40 is used to guide and facilitate the placing of the coiled electrode assembly 2 into tube 44. FIG. 9 shows a cover 46 having a glass-to-metal seal center terminal 48 being secured to the center area 50 of tab 36 using welding electrodes 52-54. The peripheral edge 56 is sealed to the inner wall of tube 44 using conventional welding means or the like. After the welding electrodes are removed and with the peripheral edge 35 of cover 26 secured to the tube 44 by conventional means, the electrolyte solution of the cell is fed through openings 34 and 22 into opening 12 of coiled electrode assembly 2. With the active components assembled in tube 44, a plug 58 is secured over opening 34 in cover 26, a sealed cell is produced as shown in FIG. 10.

FIG. 11 and 12 show tab 62 as an alternate embodiment for tab 20. Tab 62 has a central opening 64 and four additional openings 66 spaced concentric about opening 64 at 90° intervals. Each opening 66 is designed to make contact with edge 14 of electrode strip 6. The flange 68 defining each opening 66 is secured to edge 14 of electrode strip 6 using the method of this invention as described in conjunction with FIG. 3. Tab 62 also has a first arcuate slit 70 and an opposite disposed slit 72. Each slit comprises about a 220° concentric arc cut through the tab material and each slit overlaps such that the area adjacent opening 64 can be projected above and below the plane of tab 62 thereby forming a telescopic effect. Thus if cover 26 bulges, the telescopic effect caused by slits 70 and 72 will cause tab 62 to flex without disturbing the electronic contact between cover 26 and the first electrode strip 6.

FIGS. 13 and 14 show tab 74 as an alternative embodiment for tab 36. Tab 74 has a central area 76 integrally connected to the remainder of tab 74 by thin strip 78. As apparent from FIGS. 13 and 14, central area 76 can flex about strip 78 above or below the plane of tab 74. The design of the central area 76 produces a telescopic effect at the center of the tab 74. As discussed above, the width of strip 78 can be selected so that if a current is produced in the cell above a certain amount, the strip will burn and break the electrical contact of the cell's circuit. As shown in FIG. 9, the central terminal 48 can be secured to the central area 76 so that if cover 46 bulges, the central area 76 can flex without disturbing the electronic contact between terminal 48 and the second electrode strip 8. Tab 74 also has four closed protrusions 80 spaced concentric about the central area 76 at 90° intervals. Each protrusion 80 is designed to make contact with edge 16 of electrode strip 8. The closed protrusions 80 can be secured to edge 16 of the electrode strip 8 using the method of this invention as described in conjunction with FIG. 6.

Figure 3:
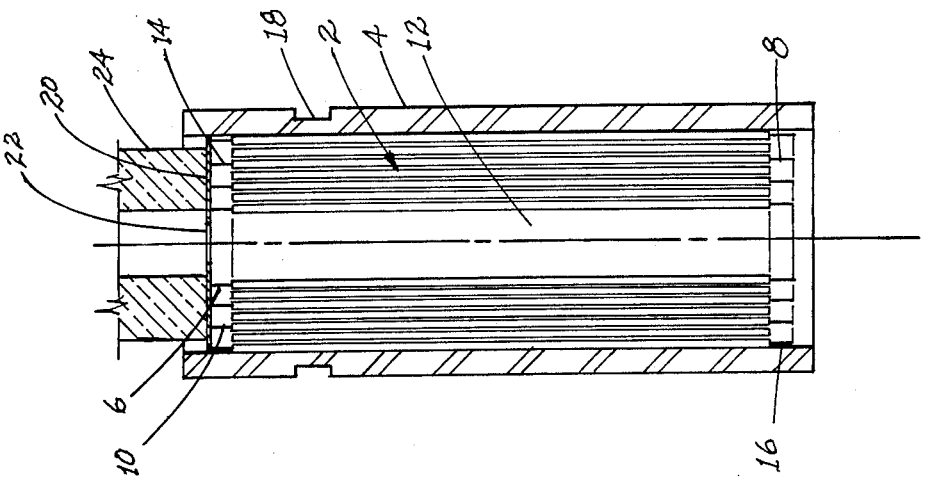
FIG. 3 is a sectional elevational view of the coiled electrode assembly of FIG. 2 showing the welding of the circular tab to the edge of the first electrode strip.
Figure 2:
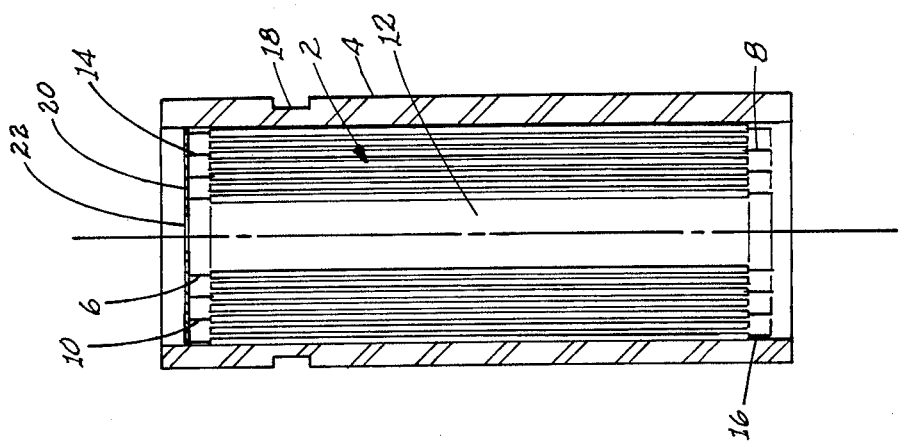
FIG. 2 is a sectional elevational view of the coiled electrode assembly of FIG. 1 having a first circular tab disposed onto the edge of the first electrode strip.
Figure 1:
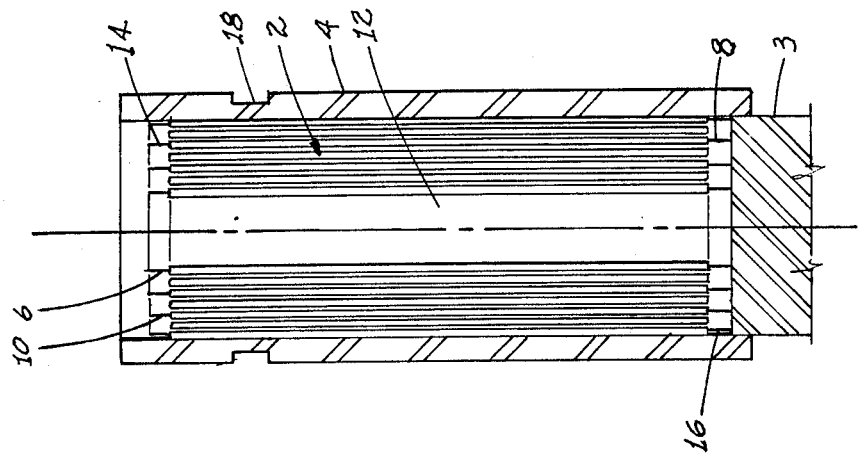
FIG. 1 is a sectional elevational view of a coiled electrode assembly in a tubular carrier.

Although preferred embodiments of this invention has been described in detail, it is contemplated that modifications and changes to the preferred embodiments of the invention herein shown and described can be made without departing from the spirit and scope of the invention.

What is claimed:

1. A method of assembling a cell employing a coiled electrode assembly comprising the steps:

(a) preparing a coiled electrode assembly by superimposing and overlapping a first electrode strip onto a second electrode strip with an insulating separator between said first electrode strip and said second electrode strip and winding said first electrode strip, said separator and said second electrode strip into a coiled electrical assembly having a central disposed opening with the edge of said first electrode protruding from one end of said coiled electrode assembly and the edge of said second electrode strip protruding from the opposite end of said coiled electrode assembly;

(b) electronically connecting and securing a first conductive tab onto the projected edge of the first electrode strip, said first conductive tab having a centrally disposed opening in alignment with said centrally disposed opening in said coiled electrode assembly;

(c) securing a first conductive cover having a centrally disposed opening onto said first conductive tab with said opening in alignment with said opening in said first conductive tab and said opening in said electrode assembly thereby adapting said first conductive cover as the first electrode terminal;

(d) electronically connecting and securing a second conductive tab onto the projected edge of said second electrode strip;

(e) positioning said coiled electrode assembly into a tube, said tube having a closed end with a centrally disposed conductive terminal;

(f) securing said closed end having the centrally disposed conductive terminal onto said second tab such that the terminal electronically contacts said second tab thereby adapting said terminal as the second electrode terminal;

(g) sealing said first cover to the tube; feeding an electrolyte solution through said opening in said first cover and said opening in said first tab into the opening in the coiled electrode assembly; and sealing said opening in said first cover with a plug thus producing a sealed cell.

2. The method of claim 1 wherein in step (e) a cup is positioned over the end of the coiled electrode assembly containing the second conductive tab and then said end is fed into a tube where the cup is positioned at the opposite end of the tube and then a second cover having a centrally disposed conductive terminal is secured to the end of the tube thereby providing said closed end for said tube.

3. The method of claim 1 wherein in step (c) the opening in coiled electrode assembly is larger than the openings in the first conductive tab and the first conductive cover so that said securing of said cover to said tab is accomplished by placing one welding electrode through the opening in the coiled electrode assembly to contact the area of the first conductive tab adjacent the central opening in said tab and contacting a second welding electrode to the exposed area of the first conductive cover adjacent the central opening in said cover and welding said first conductive tab to said first conductive cover using the welding electrodes.

4. The method of claim 1 wherein in step (e) the tube is closed at the end by securing a second cover having a centrally disposed conductive terminal to said tube.

5. The method of claim 4 wherein in step (f) the second cover is secured to the second conductive tab by placing one welding electrode through the openings in said first conductive cover, said first conductive tab and said coiled electrode assembly to contact the central area of said second conductive tab, and contacting a second welding electrode to the exposed terminal of the second cover and welding said central area of said second conductive tab to said terminal of the second cover using the welding electrodes.

6. The method of claim 5 wherein in step (c) the opening in coiled electrode assembly is larger than the openings in the first conductive tab and the first conductive cover so that said securing of said cover to said tab is accomplished by placing one welding electrode through the opening in the coiled electrode assembly to contact the area of the first conductive tab adjacent the central opening in said tab and contacting a second welding electrode to the exposed area of the first conductive cover adjacent the central opening in said cover and welding said first conductive tab to said first conducting cover using the welding electrodes.

7. The method of claim 1 or 4 wherein at least one of said first conductive tab and said second conductive tab has at least one slit disposed substantially about the central area of the tab to enable the central area of the tab to flex above or below the plane of the tab without effectively distorting the peripheral area of the tab.

8. The method of claim 7 wherein at least one of said first conductive tab and said second conductive tab has at least one opening defined between the central area of the tab and the peripheral edge of the tab and said opening having an extended flange that physically contacts the edge of the electrode strip extending from the coiled electrode assembly.

9. The method of claim 7 wherein at least one of said first conductive tab and said second conductive tab has four openings disposed between the central area of the tab and the peripheral edge of the tab with each opening disposed concentric about the central area of the tab at 90° intervals and each opening having an extended flange that physically contacts the edge of the electrode strip protruding from the coiled electrode assembly.

10. The method of claim 7 wherein at least one of said first conductive tab and said second conductive tab has at least one protrusion defined between the central area of the tab and the peripheral edge of the tab and said protrusion extending inwardly to physically contacts the edge of the electrode strip extending from the coiled electrode assembly.

11. The method of claim 7 wherein at least one of said first conductive tab and said second conductive tab has four protrusions disposed between the central area of the tab and the peripheral edge of the tab with each protrusion disposed concentric about the central area of the tab at 90° intervals and each protrusion extending inwardly to physically contacts the edge of the electrode strip extending from the coiled electrode assembly.

12. The method of claim 1 wherein one of said first electrode strip and said second electrode strip is an active anode.

13. The method of claim 1 wherein one of said first electrode strip and said second electrode strip comprises an anode current collector along with an active anode.

14. The method of claim 1 wherein one of said first electrode strip and said second electrode strip is an active cathode.

15. The method of claim 1 wherein one of said first electrode strip and said second electrode strip is a cathode current collector.

16. The method of claim 1 wherein one of said first electrode strip and said second electrode strip comprises a cathode current collector along with an active cathode.

17. The method of claim 12 or 13 wherein said anode is selected from the group consisting of lithium, sodium, calcium, magnesium and zinc.

18. The method of claim 14 or 15 wherein said active cathode is selected from the group consisting of $MnO_2$, $CuO$, $Ag_2O$, $FeS_2$, $TiS_2$, $(CF_x)_n$ where x is larger than 0 and less than 1, and $(C_2F)_n$.

19. The method of claim 15 employing an active cathode selected from the group consisting of $SOCl_2$, $SO_2Cl_2$ and $SO_2$.

20. The method of claim 1 employing an organic electrolyte and wherein one of the electrode strips is lithium and the other electrode strip is selected from the group consisting of $MnO_2$, $CuO$, $FeS_2$, and $TiS_2$.

21. The method of claim 1 wherein one of the electrode strips is a carbonaceous material and wherein an active cathode is employed which is selected from the group consisting of $SOCl_2$, $SO_2Cl_2$ and $SO_2$.

22. An electrochemical cell comprising a coiled electrode assembly and electrolyte solution assembled in a housing, said housing comprising a tube closed at each end by a cover; said coiled electrode assembly comprising a first electrode strip superimposed on and overlapping a second electrode strip and a separator disposed between said first electrode strip and said second electrode strip; said first electrode strip, said second electrode strip and said separator wound into a coiled electrode assembly such that said first electrode strip is electronically insulated from said second electrode strip by said separator and the edge of said first electrode strip protrudes from one end of the coiled electrode assembly and the edge of said second electrode strip protrudes from the opposite end of the coiled electrode assembly; a first conductive tab having an opening at the center and being in electronic contact with and secured to the edge of the first electrode strip; a first cover secured to one end of the tube and having a centrally disposed opening, said first cover electronically in contact with and secured to said first tab thereby adapting said first cover as the first electrode terminal; a second conductive tab in electronic contact with and secured to the edge of the second electrode strip; a second conductive closure secured to the opposite end of the tube and having at least a central conductive portion in electronic contact with and secured to said second tab thereby adapting the central conductive portion of said second conductive closure as the second electrode terminal; and said opening in the first conductive cover closed by a plug.

23. The electrochemical cell of claim 22 wherein one of said first electrode strip and second electrode strip is an active anode.

24. The electrochemical cell of claim 22 wherein one of said first electrode strip and said second electrode strip comprises an anode current collector along with an active anode.

25. The electrochemical cell of claim 22 wherein one of said first electrode strip and said second electrode strip is an active cathode.

26. The electrochemical cell of claim 22 wherein one of said first electrode strip and said second electrode strip is a cathode current collector.

27. The electrochemical cell of claim 22 wherein one of said first electrode strip and said second electrode strip is a cathode current collector along with an active cathode.

28. The electrochemical cell of claim 23 or 24 wherein said anode is selected from the group consisting of lithium, sodium, calcium, magnesium and zinc.

29. The electrochemical cell of claim 22 or 24 employing an active cathode selected from the group consisting of $MnO_2$, CuO, $Ag_2O$, $FeS_2$, $TiS_2$, $(CF_x)_n$ where x is larger than 0 and less than 1, and $(C_2F)_n$.

30. The electrochemical cell of claim 26 employing an active cathode selected from the group consisting of $SOCl_2$, $SO_2Cl_2$ and $SO_2$.

31. The electrochemical cell of claim 22 employing an organic electrolyte and wherein one of the electrode strips is lithium and the other electrode strip is selected from the group consisting of $MnO_2$, CuO, $FeS_2$, and $TiS_2$.

32. The electrochemical cell of claim 22 wherein one of the electrode strips is a carbonaceous material and wherein an active cathode is employed which is selected from the group consisting of $SOCl_2$, $SO_2Cl_2$ and $SO_2$.

* * * * *